United States Patent
Nishimoto et al.

(10) Patent No.: US 7,043,602 B2
(45) Date of Patent: May 9, 2006

(54) DISKARRAY SYSTEM

(75) Inventors: Akira Nishimoto, Sagamihara (JP); Naoto Matsunami, Miura (JP); Ikuya Yagisawa, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 21 days.

(21) Appl. No.: 10/860,843

(22) Filed: Jun. 3, 2004

(65) Prior Publication Data

US 2005/0223167 A1 Oct. 6, 2005

(30) Foreign Application Priority Data

Mar. 30, 2004 (JP) ............................. 2004-099118

(51) Int. Cl.
*G06F 12/00* (2006.01)

(52) U.S. Cl. .................. 711/112; 711/113; 711/154; 711/156; 711/103; 711/114

(58) Field of Classification Search ................ 711/156, 711/154, 158, 159, 113, 112, 114, 203, 170, 711/162; 707/205; 714/6
See application file for complete search history.

(56) References Cited

U.S. PATENT DOCUMENTS

| | | | | |
|---|---|---|---|---|
| 5,218,685 A | * | 6/1993 | Jones | 711/160 |
| 5,233,576 A | * | 8/1993 | Curtis et al. | 369/13.02 |
| 5,321,824 A | * | 6/1994 | Burke et al. | 711/220 |
| 5,475,820 A | * | 12/1995 | Natrasevschi et al. | 711/100 |
| 5,481,691 A | * | 1/1996 | Day et al. | 711/133 |
| 5,584,007 A | * | 12/1996 | Ballard | 711/113 |
| 6,000,020 A | | 12/1999 | Chin et al. | |
| 6,078,990 A | | 6/2000 | Frazier | |
| 6,138,203 A | | 10/2000 | Inokuchi et al. | |
| 6,330,648 B1 | | 12/2001 | Wambach et al. | |
| 6,615,330 B1 | * | 9/2003 | Debiez et al. | 711/163 |
| 2004/0186858 A1 | | 9/2004 | McGovern et al. | |
| 2005/0097260 A1 | * | 5/2005 | McGovern et al. | 711/100 |

FOREIGN PATENT DOCUMENTS

| | | |
|---|---|---|
| JP | 07-013705 | 1/1995 |
| JP | 09-265714 | 10/1997 |

OTHER PUBLICATIONS

S. Quinlan, "A Cached WORM File System" Software-Practice and Experience, vol. 21, No. 12, pp. 1289-1299 (11 pages), Dec. 1991.*
D. Patterson, et al. "A Case for Redundant Arrays of Inexpensive Disks (RAID)", ACM SIGMOD conference proceeding, Chicago, IL Jun. 1-3, 1988, pp. 109-116.
"Building a SAN," SunExpert Magazine (Mar. 1999).

* cited by examiner

*Primary Examiner*—Hong Kim
(74) *Attorney, Agent, or Firm*—Townsend and Townsend and Crew LLP

(57) ABSTRACT

A diskarray system includes a disk device for storing write data received from a computer, a cache memory, and a controller for controlling input and output of data to and from the disk device. The controller determines whether or not the write data is already written in a storage area of the diskarray system to be written specified by a write command received from the computer. When the write data for the storage area to be written is not written yet in the diskarray system, the controller receives the write data according to the write command and stores the received data in the cache memory.

13 Claims, 9 Drawing Sheets

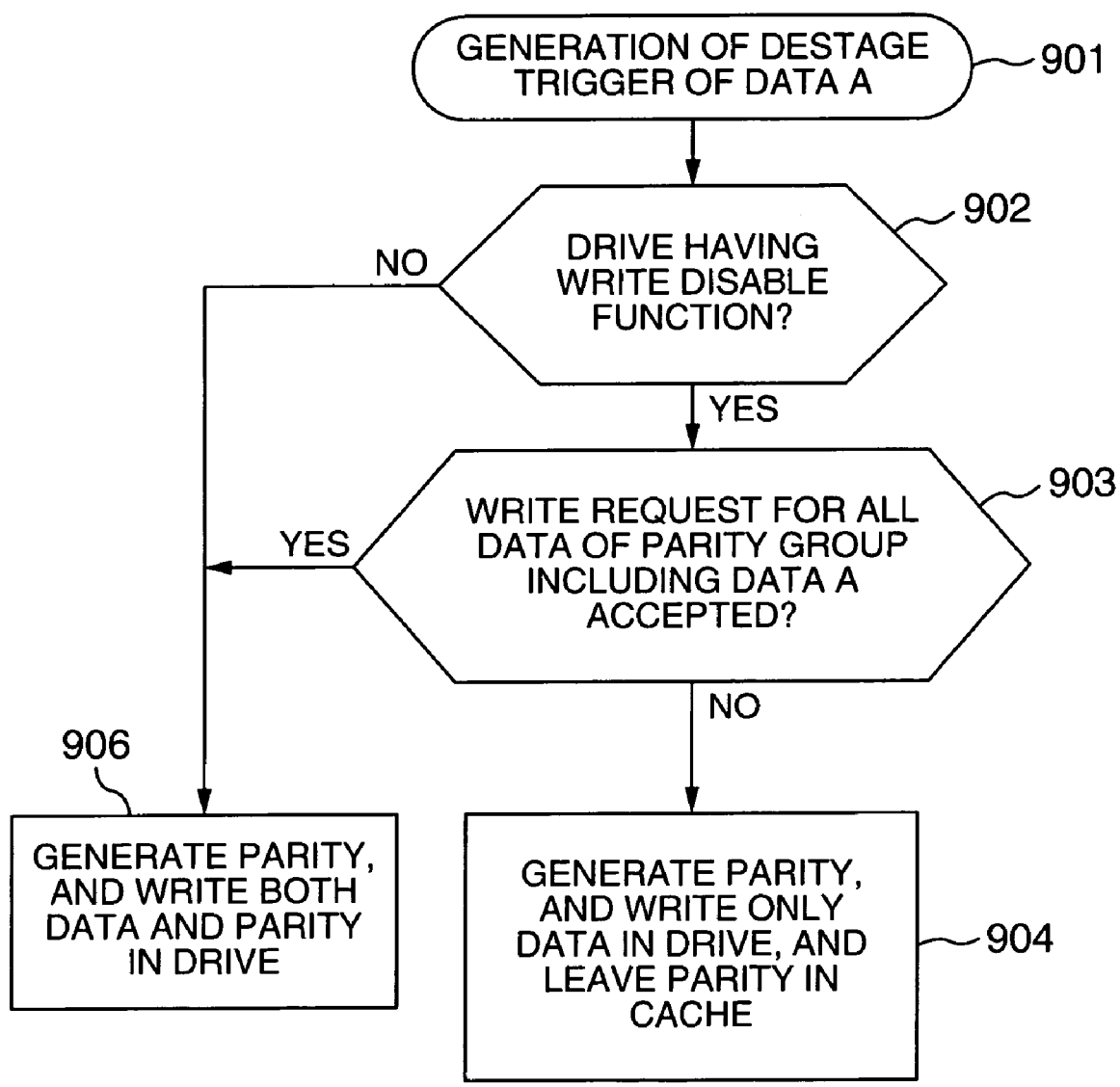

DISKARRAY SYSTEM

INCORPORATION BY REFERENCE

The present application claims priority from Japanese application JP2004-099118 filed on Mar. 30, 2004, the content of which is hereby incorporated by reference into this application.

BACKGROUND OF THE INVENTION

The present invention relates to an array type storage system made of WORM media such as WORM disks which inhibit once-recorded information from being updated.

A diskarray system is a storage system which is called a RAID (Redundant Arrays of Inexpensive Disks) system having a plurality of disk devices arranged in the form of an array, wherein a read request (data read request) and a write request (data write request) from a host machine are processed at high speed through the parallel operation of the disks, and redundant data is attached to data to improve the data reliability.

At present, such disk devices as hard disks whose data can be updated as necessary are generally employed as disk devices of a diskarray system. However, such a disk device as rewritable its data as necessary has a problem that the disk device cannot cope with unexpected user data destruction resulting, e.g., from a format command or the like entered by the operator or user of the host machine through his erroneous operation, or with intended user data destruction resulting, e.g., from a computer virus which is originally intended to destroy user data.

For the purpose of solving the above problem, there has been proposed a hard disk device which has a WORM (Write Once Read Many) function of enabling data writing operation only once, or in other words, disabling data updating (or overwriting). Such a WORM disk device is realized, for example, by providing a flag allowing writing operation to each sector in the disk device. A recording medium or media having such a WORM function, or a disk device or devices having the WORM function will be referred to merely as WORM drive or drives or WORM disk or disks, hereinafter.

Further, there has been developed a diskarray system wherein WORM media allowing writing operation only once such as CD-Rs are used.

With regard to the diskarray system, there is a technique for arranging data on a disk array as disclosed, e.g., in D. Patterson, et al: "A Case for Redundant Arrays of Inexpensive Disks (RAID)", ACM SIGMOD conference proceeding, Chicago, Ill. Jun. 1–3, 1988, pp. 109–116. A technique for a diskarray system using a media such as CD-Rs allowing writing operation only once is disclosed in JP-A-7-13705. Also disclosed in JP-A-9-265714 is a technique of how to handle redundant data which becomes a problem in the diskarray system of a plurality of disk devices including at least one disk device having the redundant data stored therein.

SUMMARY OF THE INVENTION

When a diskarray system is made up of WORM media, data once written in the WORM media is ensured not to be updated by means of hardware. Since the diskarray system has a cache, however, when 'write after' operation using the cache is carried out, write data from a host computer is once stored in the cache. The word 'write after' operation as used herein means that, when the diskarray system receives a write request, write data is once stored in the cache, at which time a complete report to the write request is transmitted to the host computer, and then actual writing operation of the write data in the cache is carried out. Thus, if the cache is not a WORM medium, then the data on the cache written in the diskarray system from the host computer may be updated (that is, the data may be overwritten on the cache). As a result, the changed data may possibly be written from the cache to the WORM medium. For the purpose of preventing such data updating, WORM is required to be ensured over the entire diskarray system including the cache.

To this end, the diskarray system includes a storage device for storing the write data received from the computer, a cache memory, and a controller for controlling input and output of data to and from the storage device. The controller decides whether or not write data is already written in a storage area for the data to be written and specified by a write command received from the computer. When the write data is not written yet in the storage area to be written, the controller receives the write data and stores the write data in the cache memory according to the write command. As a result, WORM can be ensured even to data on the cache in the diskarray controller.

Other objects, features and advantages of the invention will become apparent from the following description of the embodiments of the invention taken in conjunction with the accompanying drawings.

BRIEF DESCRIPTION OF THE DRAWINGS

FIG. 9 is a flow chart showing an example of operations of the diskarray system of the fourth embodiment.

DESCRIPTION OF THE EMBODIMENTS

The present invention will be explained in connection with embodiments of the invention.

The present invention is not restricted by detailed explanation which will be embodied below.

Figure 1:
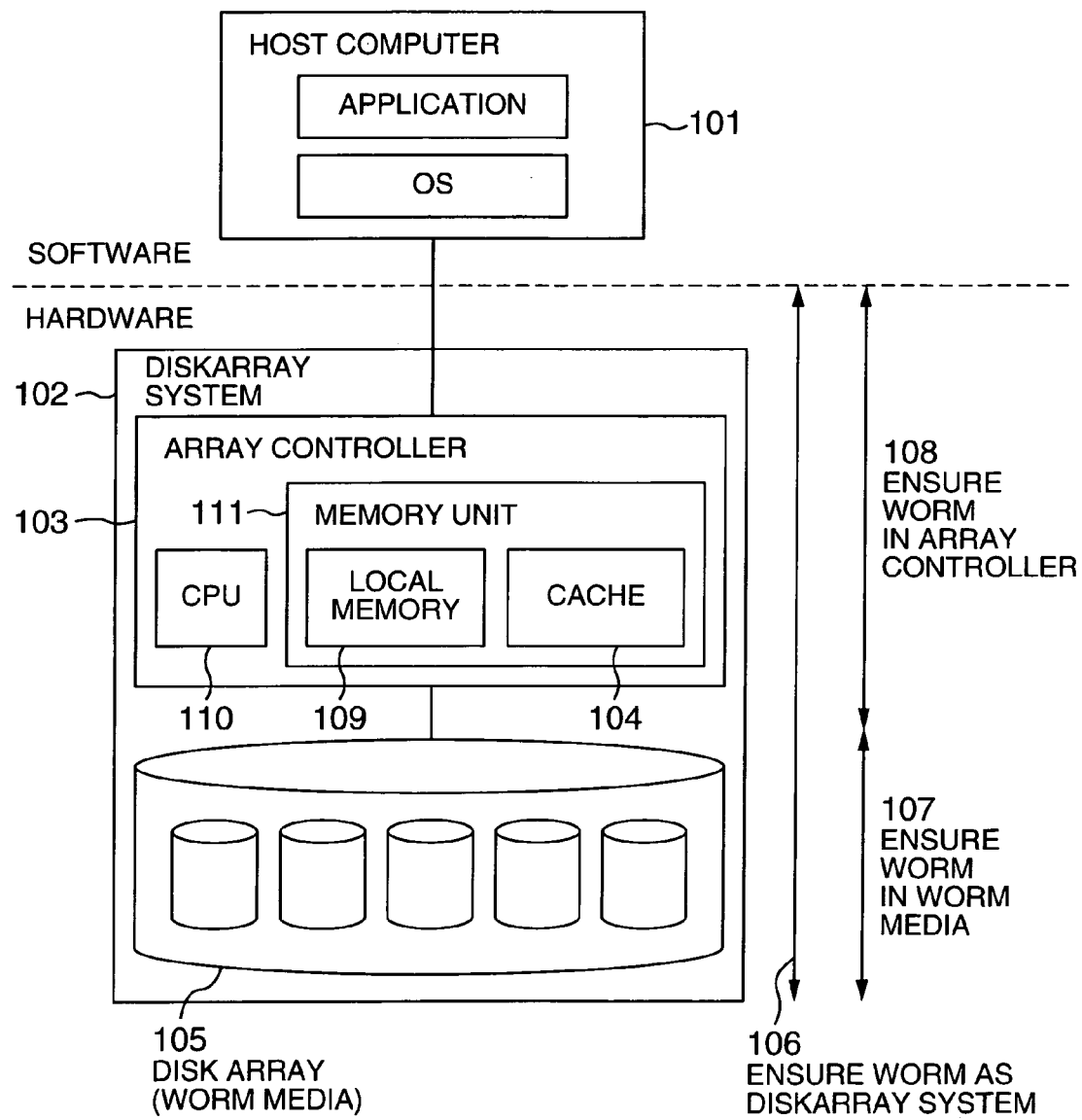
FIG. 1 shows an example of a diskarray system to which the present invention is applied.

FIG. 1 shows an example of a diskarray system to which the present invention is applied. In FIG. 1, reference numeral 101 denotes a host computer, numeral 102 denotes a diskarray system, 103 denotes an array controller for controlling the diskarray system 102, and 105 denotes a disk array including a plurality of disk devices. The array controller 103 has a CPU 110 for controlling the diskarray system, a local memory 109 for storing a micro program or control data to be executed on the CPU 110, and a cache 104 for temporarily storing data stored in the disk array. In this connection, the local memory 109 and the cache 104 may be combined into a single memory 111. The disk array 105 may be made up of WORM drives alone, or may be made up of both such WORM drives and ordinary disk devices which can be selectively used depending on data to be stored therein.

When WORM media such as WORM drives are used as the disk devices of the disk array 105, the WORM function of the WORM media ensures the prevention of data from being tampered with in the disk array, as shown by reference numeral 107. The present invention ensures the WORM at the level of the array controller, as shown by reference numeral 108. In other words, WORM is ensured even to data on the cache in the cache 104. This means that data can be ensured to be prevented from being rewritten in the entire diskarray system 102, as shown by reference numeral 106.

Embodiment 1:

In the present embodiment, for the purpose of managing the writing to all sectors having a WORM attribute in the disk devices of the disk array 105, a table for managing the writing to a WORM attribute sector is provided in the array controller 103 to ensure WORM in the entire diskarray system 102.

The present embodiment will be explained with reference to FIGS. 2 and 3.

Figure 2:
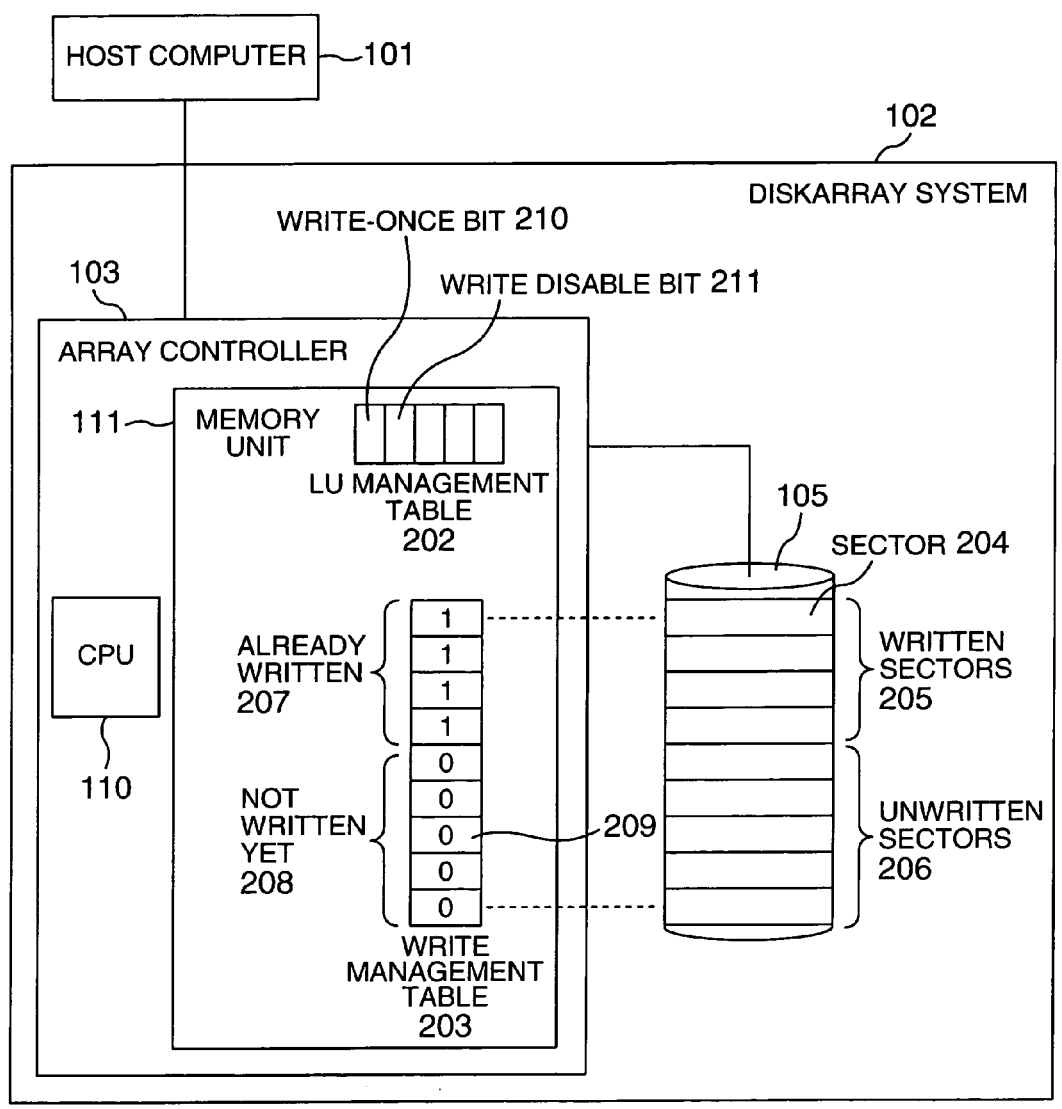
FIG. 2 shows an example of a diskarray system in accordance with a first embodiment.

In the present embodiment, as shown in FIG. 2, an LU management table 202 indicating a write attribute for each logical unit (LU) for storing data as well as a write management table 203 containing write attributes associated with sectors of the disk devices in the disk array 105 are provided in the memory 111 of the diskarray system 102. The word "LU" as used herein refers to a logical storage area of the disk devices present in the disk array 105. The write management table 203 and the LU management table 202 are stored in the local memory 109 or in the cache 104, provided in the memory 111.

The LU management table 202 contains a write-once bit 210 and a write disable bit 211 for each LU, indicating a write attribute for each LU. For example, if the write-once bit 210 is 1, then the corresponding LU has a WORM attribute of write once, that is, not allowing data updating. If the write disable bit 211 is 1, then the corresponding LU is inhibited from being written and is not allowed any data to be written after the bit is set at 1.

The write management table 203 indicates whether or not writing to each sector is already carried out for each sector as a minimum write unit of the disk devices in the disk array 105. Each entry of the write management table 203 corresponds to each sector, and holds its write management information. If the value of the entry is 1, then this indicates the sector in which data is already written; whereas, if the entry value is 0, then this indicates the sector in which the data is not written yet. In the example of FIG. 2, areas shown by numeral 207 indicate that data are already written therein; while areas shown by numeral 208 indicate that data are not written yet therein. The condition of "writing to the sector is already carried out" as used herein includes not only a condition that write data was actually stored in a sector of the disk device but also a condition that the array controller 103 received the write data for the sector and stored the write data in the cache 104. This means that if the write management information has a value of 1, then the write data is actually written in the sector corresponding to the write management information, or the write data for the sector is received by the array controller 103 and stored in the cache 104. The following explanation will be made on the assumption that the write management table 203 holds the write management information about all sectors of the disk devices in the disk array 105. However, the write management information relating to the sectors forming the LUs having the WORM attribute may be held in the table.

Figure 3:
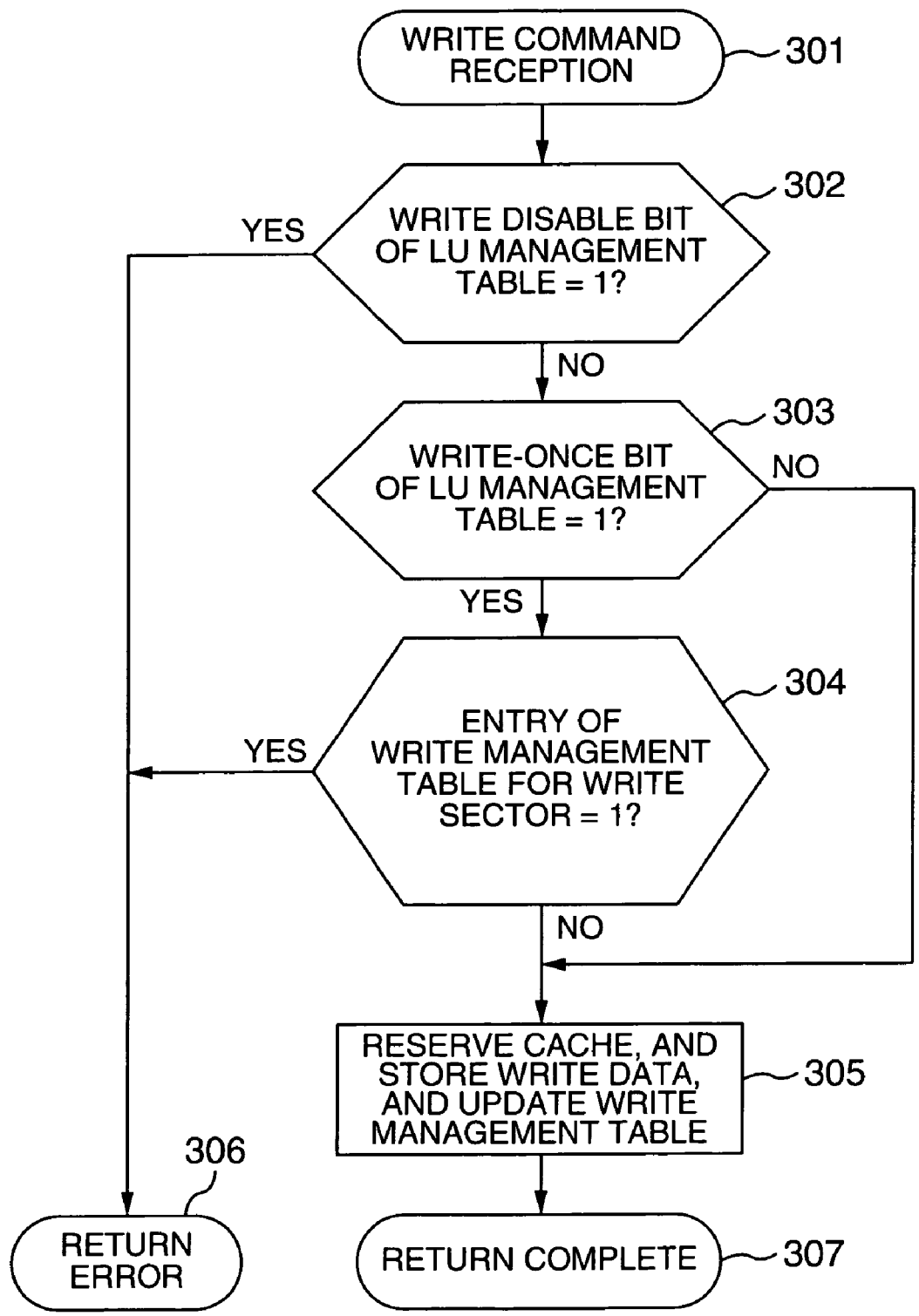
FIG. 3 is a flow chart showing an example of operations of the diskarray system of the first embodiment.

FIG. 3 is a flow chart showing operations of the diskarray system 102 when the system receives a write command from the host computer 101.

In a step 301, when the array controller 103 receives a write command, the CPU 110 first examines the write disable bit 211 of the LU management table 202 in a step 302. When the write disable bit of an LU to be written specified by the write command has a value of 1 as a result of the examination, this means that writing to the LU is not allowed. Thus the CPU 110 returns an error to the host computer while not receiving write data from the host computer in a step 306.

If the writing to the LU to be written is enabled in the step 302, then the CPU 110 examines the write-once bit 210 of the LU management table 202 in a step 303.

When the write-once bit 210 for the LU to be written is 0, the corresponding LU uses a non-WORM disk or the like and has no WORM attribute. Thus the CPU 110, as in the prior art, reserves a storage area in the cache 104 in a step 305, receives the write data from the host computer 101, and stores the write data in the reserved area of the cache 104. After reserving the storage area of the cache 104, the CPU 110 also updates to "1" an entry corresponding to the sector to be written in the write management table 203 to thereby update the write management information of the associated sector. And the CPU 110 returns a complete reply to the host computer in a step 307.

If the write-once bit for the LU to be written is 1 in the step 303, then updating of the data written in the corresponding LU is disabled. Thus in a step 304, the CPU 110 examines whether or not data is already written in the sector to be written specified by the received write command by inspecting the corresponding entry of the write management table 203. In the examination, even in the case where data is not actually written in the to-be-written sector of the disk device, if write data to the to-be-written sector is already written in the cache 104, then the CPU determines that data is already written.

When the value of an entry of the write management table 203 corresponding to the to-be-written sector is 0, the CPU 110 determines that the to-be-written sector is to be written. In the step 305, the CPU reserves a storage area in the cache 104, receives the write data from the host computer, and stores the received data in the storage area reserved in the cache 104. The CPU 110 further updates the value of the to-be-written sector of the write management table to "1". And the CPU 110 returns a complete signal indicative of completion of the write operation to the host computer in the step 307.

When the value of the entry of the write management table 203 corresponding to the to-be-written sector is "1" in the step 304, This means that data is already written in the sector and overwriting to the sector is disabled. Thus the array controller 103 returns an error to the host computer while not receiving write data therefrom in the step 306.

The data stored in the cache 104 in the step 305 of FIG. 3, is stored in associated one of the disk devices in the disk array 105 at arbitrary timing under control of the array controller 103. This processing operation will be detailed in Embodiment 4.

In the present embodiment, explanation has been made in connection with the case where each entry of the write management table 203 is associated with each sector as the minimum access unit of the disk devices. However, each entry is not restricted to being associated with each sector, but the entry of the write management, table 203 may be associated with a storage area unit larger than the sector.

Embodiment 2:

Explanation will next be made as to a diskarray system which ensures WORM when using a recordable file system. As the recordable file system, there is known a file system which uses a universal disk format (UDF). In the UDF, all files are expressed by file identifier descriptors (FIDs). The FID is a line number of a virtual allocation table (VAT), the address of the file entity is written in the entry of the corresponding VAT, and the file is indirectly accessed. When the file is changed, its updated file address is newly written in the VAT entry. And when an information control block (ICB) of the VAT indicative of the address of the VAT is located at a position returned by an amount corresponding to a linking area from the final sector having data of a WORM medium written therein, the file can be stored in the WORM medium in a write-once read many (WORM) manner.

Figure 4:
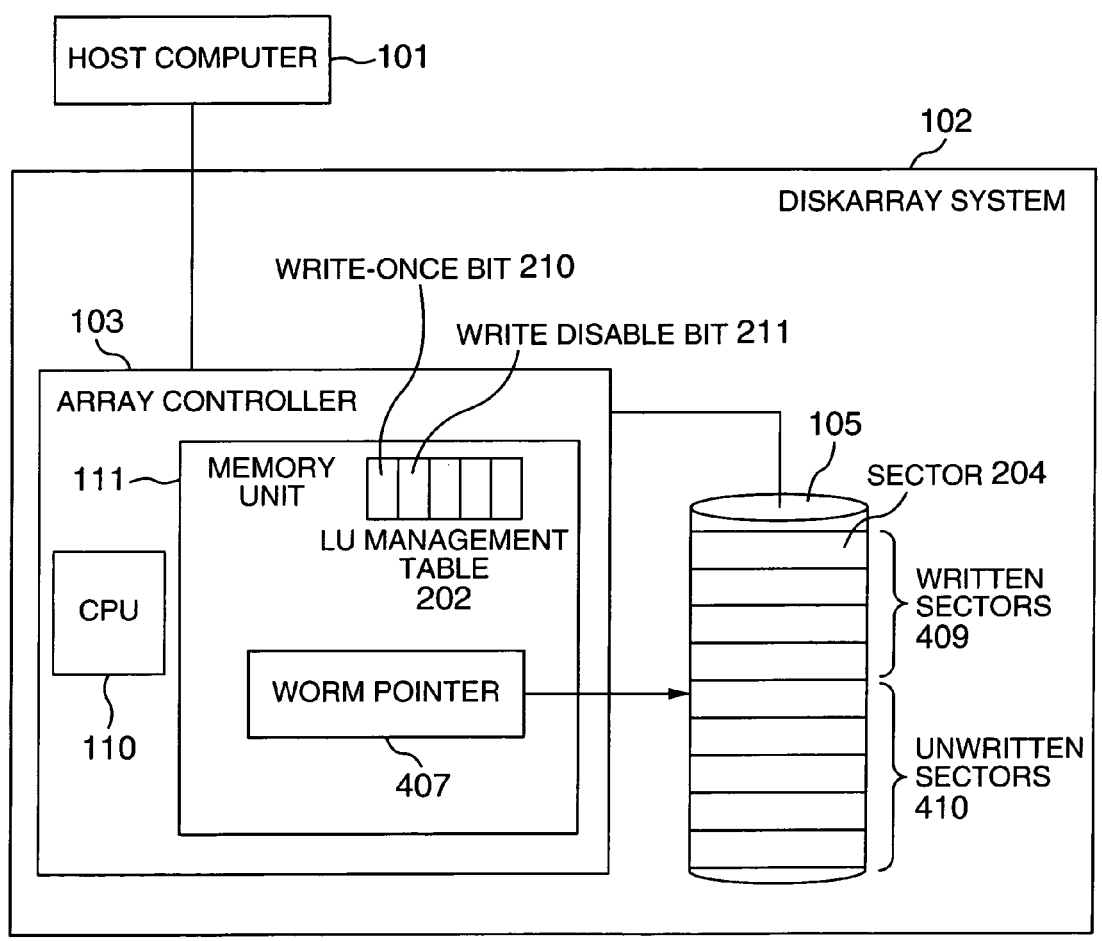
FIG. 4 shows an example of a diskarray system in accordance with a second embodiment.

In an embodiment shown in FIG. 4, a diskarray system 102 has a structure nearly similar to the diskarray system 102 of the embodiment 1, but is different from the embodiment 1 in that, in addition to the LU management table 202 explained in the embodiment 1, a newly introduced WORM pointer 407 is present in the memory 111.

In the present embodiment, an LU in the diskarray system is accessed through the recordable file system of the host computer. In the recordable file system, data are written into the diskarray system 102 sequentially (i.e., in an address order of continuous address areas).

The WORM pointer 407 is a pointer pointing an address at which data is next to be written. Accordingly, so long as the recordable file system is normally operated and the LU is unauthorizedly accessed, the next data is written at the address pointed by the WORM pointer 407. In FIG. 4, reference numeral 409 denotes areas where data are already written, numeral 410 denotes areas where data are not written yet, and the WORM pointer 407 points a head address of the not-written areas 410.

Figure 5:
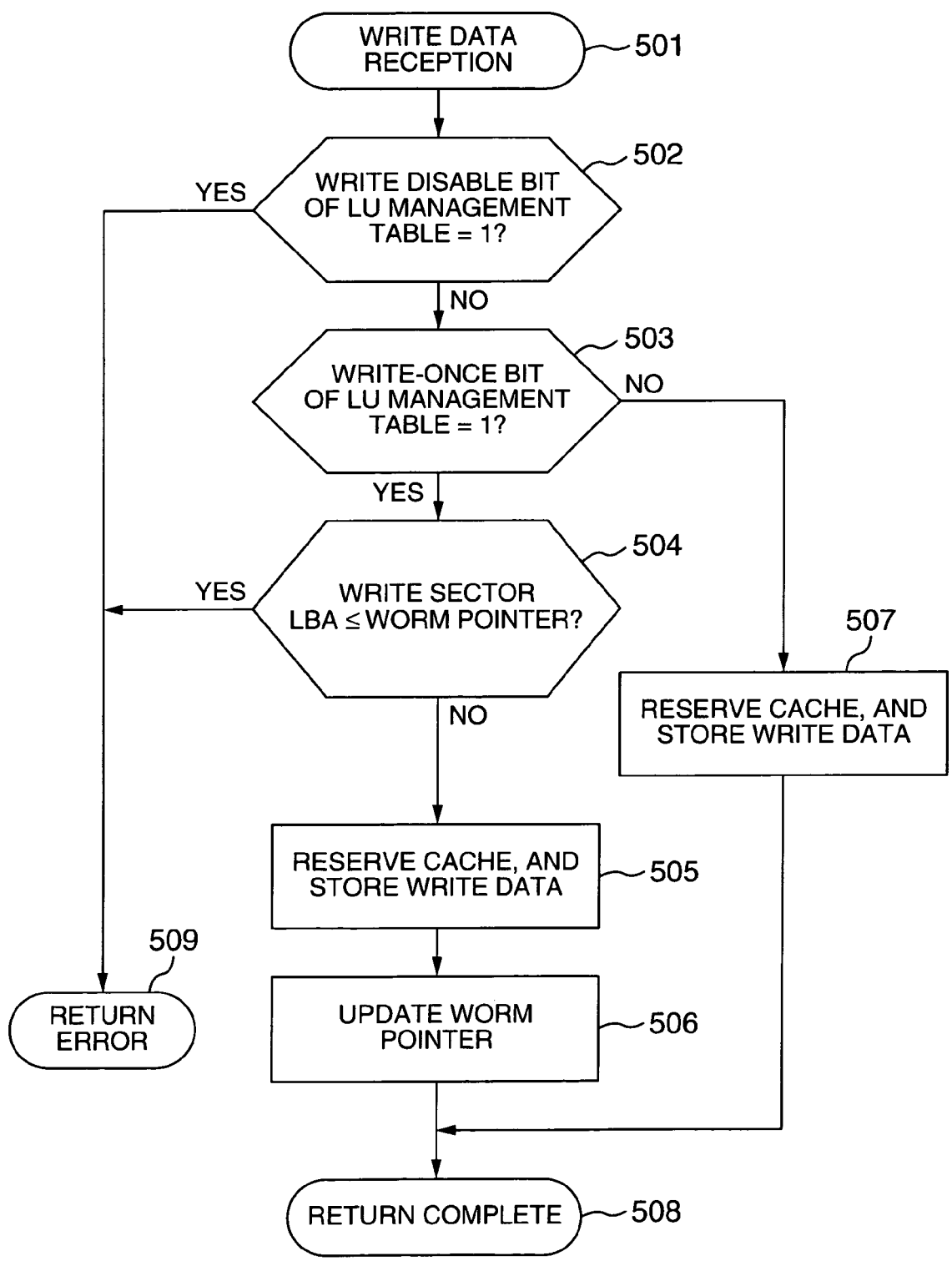
FIG. 5 is a flow chart showing an example of operations of the diskarray system of the second embodiment.

FIG. 5 is a flow chart showing an example of operations of the diskarray system in accordance with the present embodiment.

In a step 501, when the array controller 103 receives a write command, the CPU 110 first examines the write disable bit 211 of the LU management table 202 for an LU to be written specified by the write command in a step 502. When the write disable bit for the to-be-written LU is 1, writing to the corresponding LU is disabled, so that the CPU 110 returns an error to the host computer.

When writing to the to-be-written LU is enabled in the step 502, the CPU 110 examines the write-once bit 210 of the LU management table 202 in a step 503. When the write-once bit 210 of the to-be-written LU is 0, the corresponding LU uses a non-WORM disk or the like and has no WORM attribute. Thus, the CPU 110 reserves a storage area in the cache 104, receives write data from the host computer, and stores it in the cache 104 in a step 507 as in the prior art. In a step 508, the CPU 110 returns a complete signal to the host computer.

When the write-once bit of the LU to be written is 1 in the step 503, on the other hand, updating of data already written in the LU is not enabled. Accordingly, in a step 504, the CPU 110 examines whether or not data is already written in a sector to be written specified by the write command. Even in the examination, as in the embodiment 1, when the write data is not written in the to-be-written sector of the disk device but when the write data to the to-be-written sector is already written in the cache 104, it is determined that the data is already written. In this examination, the WORM pointer 407 is compared with the logical block address (LBA) of the head sector of the to-be-written areas specified by the write command. When the head LBA of the to-be-written areas included in the write command is not lower than the LBA pointed by the WORM pointer 407, the write command is a correct command to the not-written area. Thus, the CPU 110 reserves a storage area in the cache 104, receives the write data from the host computer, and stores it in the cache 104 in a step 505. In a step 506, further, the CPU 110 advances the position of the WORM pointer 407 by an amount corresponding to the write data stored in the cache 104. And the CPU 110 returns a complete signal to the host computer in the step 508.

In the step 504, on the other hand, when the LBA of the head sector of the to-be-written areas included in the write command is smaller than the LBA pointed by the WORM pointer, the CPU 110 determines that the write command is a write request to the area where data is already written. Accordingly, in a step 509, the CPU returns an error indicative of unwritable data while not receiving the write data.

The WORM pointer 407 can also be set so that it points a tail address of the already-written areas 409. In this case, the CPU 110 in the step 504 of FIG. 5, determines that the command is a write request to an area where data is already written, even when the LBA of the head sector of the to-be-written areas included in the write command is equal to that of the WORM pointer.

Even in the present embodiment, similarly to the embodiment 1, the write data stored in the cache 104 in the step 505 is stored in the disk device of the disk array 105 at arbitrary timing under control of the 103. This processing operation will be explained in detail in the embodiment 4.

Embodiment 3:

In the present embodiment, write management information stored in each disk device provided in the disk array 105 is used to ensure the WORM function of the entire diskarray system. In the embodiment, the write management information corresponding to the respective sectors of the WORM drives of the disk array 105 are stored in predetermined storage areas of the drives. The write management information has a value of "1" when data is already written in the sector of the corresponding WORM drive, and the information has a value of "0" when data is not written yet therein. When the write data is stored in the WORM drive, control of the WORM drive itself causes the value of the write management information corresponding to the sector having the write data stored therein to be updated to "1".

Figure 6:
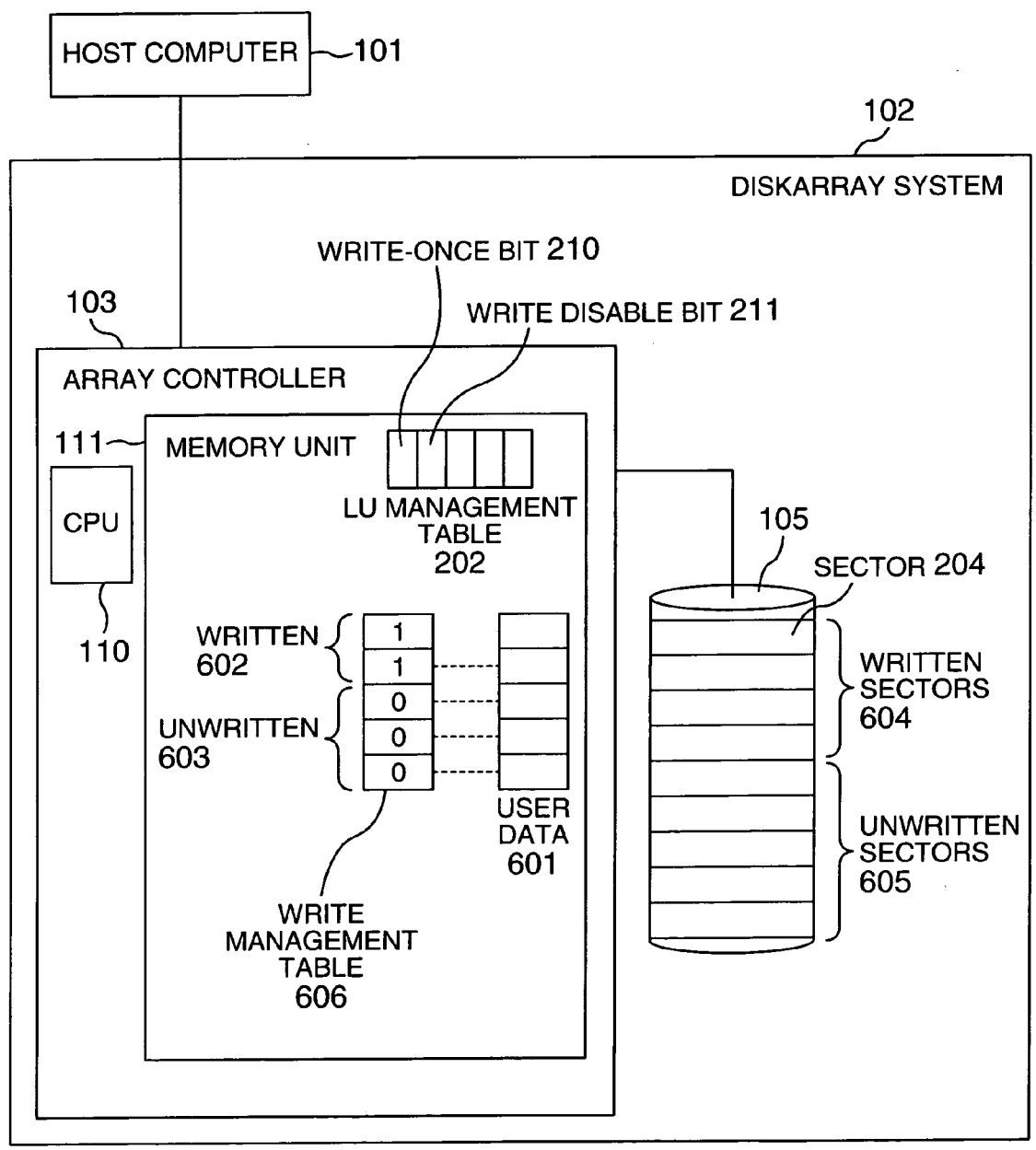
FIG. 6 shows an example of a diskarray system in accordance with a third embodiment.

FIG. 6 shows an exemplary arrangement of the diskarray system 102 in accordance with the present embodiment. The diskarray system 102 of the present embodiment has an arrangement nearly similar to that of the diskarray system 102 of the embodiment 1, but is different from the embodiment 1 in that write management information read out from a WORM drive in the disk array 105 by the array controller 103 is stored in a write management table 606 provided in the memory 111. The array controller 103 reads the write management information about necessary sectors from the WORM drive, and saves the read information in the write management table 606, as necessary. Accordingly, the write management information about all the sectors of the WORM drive in the disk array are not always stored in the write management table 606, and the write management information about only sectors necessary for the processing are stored in the write management table 606. In the example of FIG. 6, reference numeral 602 denotes areas where data are already written, and numeral 603 denotes areas where data are not written yet.

Figure 7:
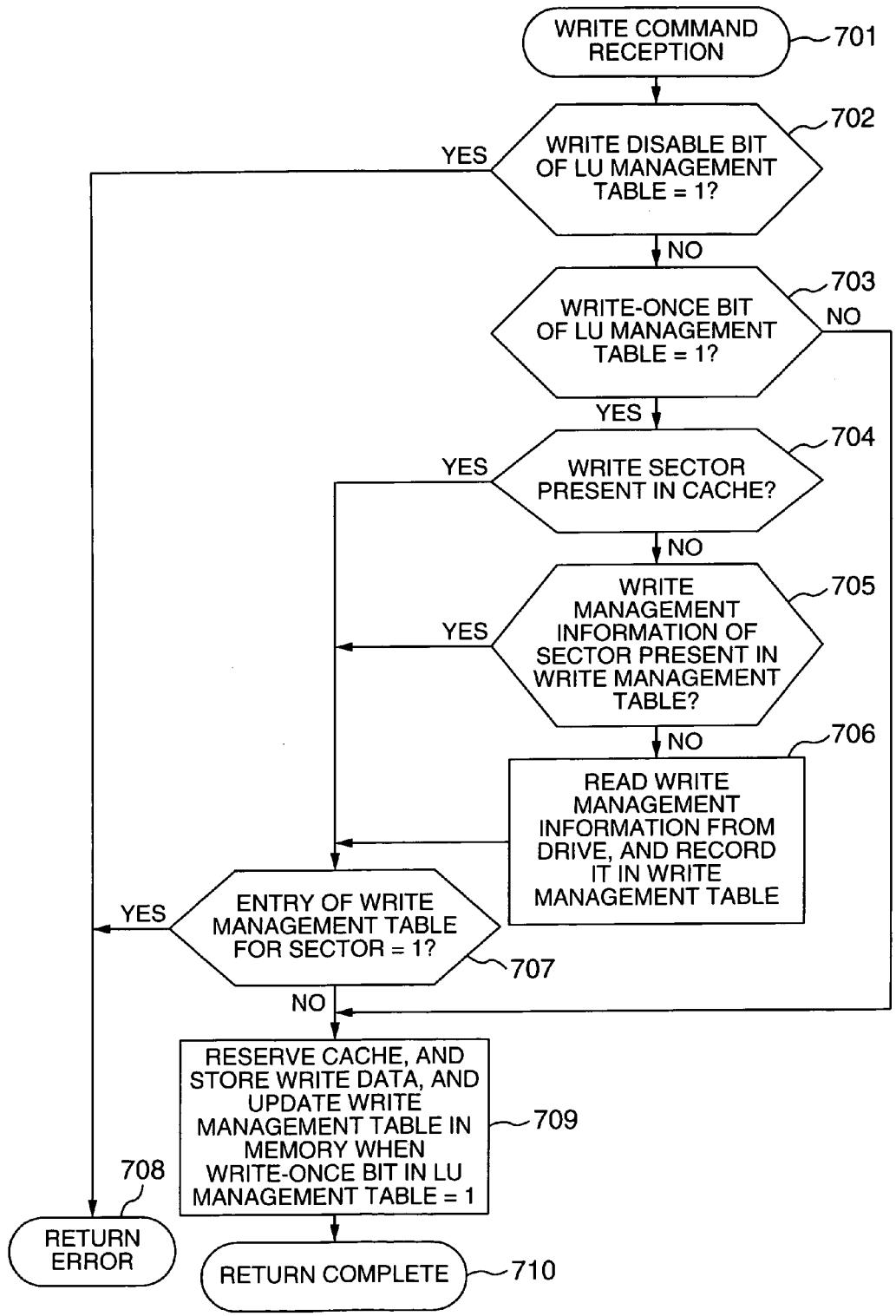
FIG. 7 is a flow chart showing an example of operations of the diskarray system of the third embodiment.

FIG. 7 is a flow chart showing operations of the diskarray system 102 of FIG. 6 when receiving a write command from the host computer 101.

In a step 701, when the array controller 103 receives a write command, the CPU 110 examines the write disable bit 211 of the LU management table 202. When the write disable bit for an LU to be written specified by the write command is 1, writing to the LU is disabled. Thus in a step 708, the CPU 110 returns an error to the host computer while not receiving write data.

When writing to the to-be-written LU is enabled in a step 702, the CPU 110 examines the write-once bit 210 of the LU management table 202 in a step 703. When the write-once bit 210 for the to-be-written LU is 0, the corresponding LU uses a non-WORM disk or the like and has no WORM attribute. Accordingly, as in the prior art, the CPU 110 reserves a storage area in the cache 104, receives the WORM drive from the host computer, stores the received data in the cache 104 in a step 709, and returns a complete signal to the host computer in a step 710.

When the write-once bit is 1 in the step 703, on the other hand, updating of the data written in the to-be-written LU is not enabled, so that the CPU 110 examines in a step 704 and subsequent steps whether or not data is already written in the to-be-written sector specified by the write command.

As mentioned above, the array controller 103 reads the write management information stored in the WORM drive in the disk array 105, and stores the read information in the write management table 606 in the memory 111. It is assumed in the present embodiment that the array controller 103 reads the write management information corresponding to the data present in the cache 104 from the WORM drive into the memory 111 and stores the information in the write management table 606.

Thus, the CPU 110 first examines whether or not data corresponding to the to-be-written sector specified by the write command is present on the cache (in other words, examines whether or not the cache hits the to-be-written sector) in a step 704. In this connection, the case "when data corresponding to the to-be-written sector is present on the cache" includes when the write data to be written in the to-be-written sector is already present on the cache, and when the write data is not written yet in the to-be-written sector but when the to-be-written sector is read from the disk and the data is already stored on the cache 104.

When the corresponding data is present on the cache, this means that the write management information corresponding to the to-be-written sector is already stored in the write management table 606 of the memory 111. Thus, in a step 707, the CPU 110 examines the write management information corresponding to the to-be-written sector read out to the memory 111. Even in this examination, when the write data is not written in the to-be-written sector in the disk device as in the embodiment 1 but when the write data for the to-be-written sector is already written in the cache 104, the CPU determines that the data is already written. When the corresponding write management information is 0, this means that no data is written in the to-be-written sector. Thus the CPU 110 reserves a storage area in the cache 104, receives the write data from the host computer, and stores the received data in the cache 104. Further, the CPU 110 updates the value of the write management information corresponding to the to-be-written sector of the write management table 606. And in the step 710, the CPU 110 returns a complete signal to the host computer. In this connection, the data to be updated in the step 709 is not the write management information stored in the WORM drive in the disk array 105, but the write management information stored in the memory 111. The write management information stored in each WORM drive is updated under control of the WORM drive itself when the write data was actually stored in the WORM drive in such a manner as mentioned above.

In the step 707, when the write management information corresponding to the to-be-written sector is 1, this means that the data is already written in the to-be-written sector. Thus the CPU 110 returns an error the host computer as a disabled write while not receiving the write data in the step 708.

When the data corresponding to the to-be-written sector is not present on the cache 104 in the step 704, the CPU 110 examines in a next step 705 the presence or absence of the write management information of the to-be-written sector on the cache 104. In the case of the presence of the write management information about the to-be-written sector on the cache, the CPU performs the operations of the step 707 and subsequent steps, as in the above case.

When the write management information about the to-be-written sector is not present in the step 705, the CPU 110 reads the write management information corresponding to the to-be-written sector from the write management table stored in the WORM drive, and stores the read information in the memory 111 in a step 706. Thereafter the information is used to execute the operations of the step 707 and subsequent steps.

The above explanation has been made in connection with the case when only the write management information is read from the drive in the step 706. However, other data on the drive that will becomes necessary for parity generation may be read and stored in the memory 111 simultaneously with the write management information.

The step 706 has been executed every time after the CPU receives the write command in the above example. However, when a storage area to be written can be predicted before the CPU receives the write command, the CPU 110 may also previously read the write management information about the to-be-written sector from the drive before receiving the write command and previously store the read information in the memory 111.

Embodiment 4:

The present embodiment is directed to how the system operates, when write data is stored in a storage area in the cache 104 and thereafter actually stored in the disk device. Therefore, the present embodiment can be applied to any of the embodiments 1, 2 and 3.

Figure 8:
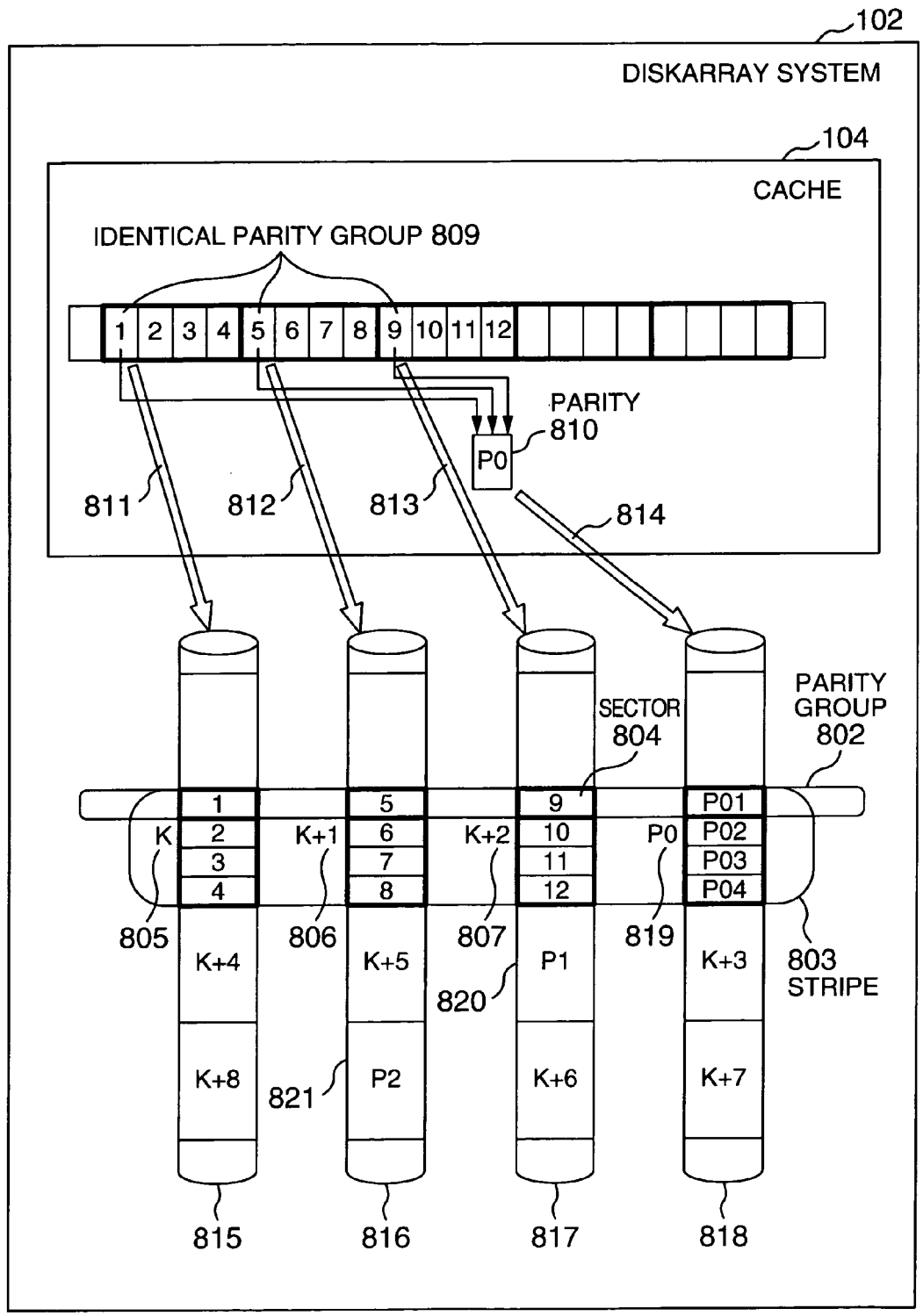
FIG. 8 shows an example of a diskarray system in accordance with a fourth embodiment.

In FIG. 8, reference numeral 102 denotes a diskarray system, numeral 104 denotes a cache on the array controller 103, 815 to 818 denote a plurality of disk devices which make up the disk array 105. In the drawing, the disk devices 815 to 818 make up a RAID5 in which a single parity is generated for three pieces of data. Reference numeral 803 denotes one stripe. Data in one stripe is divided into data K 805, data K+1 806 and data K+2 807, which in turn are located to be dispersed into different disk devices. In the data K to K+2, the data are located in an address order. Data PO 819 is parity data to the data K, K+1 and K+2. A parity group 802 indicates a set of data necessary for generating a single parity and parity data generated based on the data. For example, since data 1 in K, data 5 in K+1, and data 9 in K+2 are associated with the parity PO1; a set of these data 1, 5, 9 and the parity PO1 is called a parity group.

In the diskarray system 102, the write data received from the host computer 101 is temporarily stored in the cache, and at a suitable time point, the write data written in the cache is written to the disk device. The above writing operation of the data from the cache to the drive is triggered, as when the amount of data written in the cache exceeds a given constant value, which writing is called destage.

When the destage is performed, a parity is generated for the data stored on the cache, and the data and parity are written in the disk device. Accordingly, when the destage is performed under a condition that part of data belonging to the same parity group are not stored in the cache 104, a parity is once generated under this condition and the data and parity are written. And after the residual data is stored on the cache 104, a parity is again generated for the parity group and the residual data and the parity are written in the drive. For this reason, the write data written according to the write command from the host computer 101 will not be overwritten on the data already written in the diskarray system 102, but the parity data may be destaged a plurality of times depending on the destaging.

When ordinary, rewritable, non-WORM drives in the diskarray system are used as the disk devices, data can be overwritten on the disk device. When the system uses WORM drives, however, the data rewriting is disabled. Thus when the parity is written to the disk device a plurality of times, this results in an error.

In the present embodiment, to avoid this, only parity data 810 remains in the cache 104 until the system receives all data belonging to the same parity group. Data other than the parity can be destaged if necessary as in the prior art. In FIG. 8, for example, data 1 to 12 corresponding to the stripe 803 are stored in the cache 104. In this case, all the data 1, 5 and 9 belonging to the parity group 802 are stored in the cache 104, so that when destaging is started under this condition, the array controller 103 generates the parity PO1 from the data 1, 5 and 9; and stores the data 1, 5, 9 and the parity PO1 in the disk device together. In FIG. 8, on the other hand, when destaging is started under a condition that the data 9 is not stored yet in the cache, the array controller 103 stores the data 1 and 5 in the disk device. However, the parity data generated by the array controller 103 using the old data (i.e., data before being updated when the data 9 is stored in the cache 104) of the data 1, 5 and 9 is previously stored in the cache 104 without being stored in the disk device. And at the time when the data 9 was stored in the cache memory, the array controller performs a logical exclusive OR operation on the parity data already stored in the cache 104, the old data of the data 9, and the data 9; generates new parity data, and writes the new parity data in the disk device.

FIG. 9 is a flow chart showing an example of operations of the diskarray system of FIG. 8 when a destage is triggered. When a destage is triggered for data A stored in the cache 104 in a step 901, the CPU 110 examines in a step 902 whether or not the disk device, in which the data A is to be stored, is a WORM drive. The memory 111 of the diskarray system 102 has information indicative of whether or not each disk device in the disk array 105 is the WORM drive. Thus the CPU can determine whether or not the disk device, in which the data A is to be stored, is the WORM drive by referring to the information of the memory.

When the disk device for the data A to be stored is not the WORM drive, as in the prior art, the CPU 110 generates a parity for a parity group to which the data A belongs, and writes the data and the generated parity in the disk device in a step 906.

When the disk device for the data A to be written is the WORM drive in the step 902, the CPU 110 examines whether or not all data of the parity group including the data A were received from the host computer 101 according to a write request in a step 903. If all the data of the parity group are already received, then the CPU 110 generates a parity using the received data and writes the data and the parity to the disk device in the step 906.

When some of all the data of the parity group are not received yet according to the write request in the step 903, the CPU 110 generates a parity using the already-received data and writes only the data in the disk device in a step 904. The generated parity remains in the cache until the CPU receives all data of the parity group including the data A in the step 903. When all the data of the parity group are already received, the CPU generates a new parity using the parity already stored in the cache together with the received data in the step 906.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A diskarray system for receiving a write command from a computer, comprising:
   a disk device for storing write data received from said computer;
   a cache memory; and
   a controller configured to control input and output to and from said disk device, said controller including write management information indicative of whether or not the write data to be stored in a storage area of the disk device is already written at least either in a storage area of the disk device or in said cache memory corresponding to the storage area of said disk device for each of a plurality of storage areas in said disk device,
   wherein said disk device is a Write Once Read Many disk device in which data once written therein is inhibited from being rewritten, said controller decides whether or not write data is already written at least either in a storage area of said Write Once Read Many disk device specified by a received write command or in said cache memory corresponding to the specified storage area of said disk device by referring to said write management information, and, when the write data is not written yet in the storage area to be written, said controller receives the write data according to said write command and stores the write data in said cache memory.

2. A diskarray system according to claim 1, wherein, when the write data is already written in the storage area to be written, said controller returns an error reply while not receiving the write data, according to said write command.

3. A diskarray system according to claim 1, wherein, when the write data is already stored in the storage area of said cache memory to be written specified by the received write command, said controller determines that the write data is already written in the storage area to be written.

4. A diskarray system according to claim 1, wherein said controller comprises a write management table, said write management table holds said write management information.

5. A diskarray system according to claim 4, wherein the write management information stored in said write management table indicates the write data is already written in the storage area in said disk device of the diskarray system when the write data written in the storage area is already stored in said cache memory.

6. A diskarray system according to claim 4, wherein, when the write data is not written yet in the storage area to be written, said controller receives the write data according to the received write command, stores the received data in said cache memory, and updates the write management information recorded in said write management table with respect to the storage area to be written.

7. A diskarray system according to claim 6, wherein said controller reads the write management information stored in the predetermined storage area of the disk device and records the write management information in said write management table.

8. A diskarray system according to claim 1, wherein said controller comprises a pointer as said write management information, said pointer indicates a boundary between the storage area the write data is already received and a storage area where the write data is not received yet, and said controller determines whether or not the write data is already written in the storage area to be written by referring to said pointer.

9. A diskarray system according to claim 8, wherein, when the write data is not written yet in the storage area to be written, said controller receives the write data according to the received write command, stores the received information in the cache memory, and advances a position indicated by said pointer by an amount corresponding to the write data stored in said cache memory.

10. A diskarray system according to claim 1, wherein, when the data stored in said cache memory is to be stored in said disk device and when all data belonging to an identical parity group are already received in the diskarray system, said controller generates parity data for the parity group, stores the generated parity data in said disk device, and, when part of the data belonging to the same parity group is not received yet in the diskarray system, said controller interrupts storing of the parity data belonging to the parity group in the disk device.

11. A diskarray system comprising:
a plurality of disk devices for storing data; and
an array controller configured to control input and output from said plurality of disk devices,
wherein said array controller comprise a processor, a cache memory, and a memory, said memory stores an LU management table in which information about permission or non-permission of overwriting on data stored in each of a plurality of logical storage areas present in said plurality of disk devices is recorded, and stores a write management table including write management information indicative of whether or not write data is already written at least either in one of a plurality of sectors present in said plurality of disk devices of the diskarray system or in said cache memory corresponding to said sector, and wherein, when said array controller receives the write data, said processor determines whether or not overwriting of the data stored in the logical storage area to be written is enabled by referring to said LU management table, and, when the overwriting of the data for the logical storage area to be written is disabled, said processor determines whether or not the write data is already stored in the sector to be written or in said cache memory corresponding to the sector by referring to said write management table, and, when the write data for the sector to be written is not stored yet in the sector or the cache memory of the diskarray system, said processor receives the write data according to said write command, stores the write data in said cache memory, and updates the write management information recorded in said write management table.

12. A diskarray system according to claim 11, wherein, when the write data for the sector to be written is already stored in the sector, said processor returns an error while not receiving the write data.

13. A diskarray system according to claim 12, wherein, when the write data to be written in the to-be-written sector is already stored in said cache memory, said processor returns an error while not receiving the write data.

* * * * *